United States Patent [19]

Bergmann et al.

[11] 4,386,304

[45] May 31, 1983

[54] CONTROL DRIVE FOR A RAM ADJUSTMENT DEVICE ON A BLANKING PRESS

[75] Inventors: Ewald Bergmann, Rechberghausen; Franz Schneider; Hartmut Hoffmann, both of Göppingen; Burkhard Schumann, Ottenbach; Günther Grupp, Eislingen, all of Fed. Rep. of Germany

[73] Assignee: L. Schuler GmbH, Goeppingen, Fed. Rep. of Germany

[21] Appl. No.: 923,234

[22] Filed: Jul. 10, 1978

[30] Foreign Application Priority Data

Jul. 9, 1977 [DE] Fed. Rep. of Germany ....... 2731084

[51] Int. Cl.$^3$ .............................................. G05B 13/00

[52] U.S. Cl. .................................... 318/561; 318/632; 72/19; 100/257

[58] Field of Search ............... 318/561, 624, 626, 632, 318/653; 100/257; 72/19, 21, 31

[56] References Cited

U.S. PATENT DOCUMENTS 3,233,441 2/1966 Dunlap ............................... 100/257
3,441,818 4/1969 Tiskus et al. ........................ 318/624
3,684,961 8/1972 Muir ................................... 318/653
4,116,122 9/1978 Linder et al. .......................... 72/19
4,122,379 10/1978 Richter et al. ...................... 318/632

FOREIGN PATENT DOCUMENTS 2338429 2/1975 Fed. Rep. of Germany ...... 100/257
43-2355371 12/1968 Japan .................................. 100/257

*Primary Examiner*—J. V. Truhe
*Assistant Examiner*—Eugene S. Indyk
*Attorney, Agent, or Firm*—Craig & Burns

[57] ABSTRACT

In control drives for high speed blanking presses, a serious problem of excessive tool wear arises from increases in the immersion depth of a top tool into its associated bottom tool when the stroke frequency increases. To overcome this, a control drive is provided wherein the top tool is held at a substantially constant immersion depth in the opening in the bottom tool over the entire stroke frequency range of the press. A measuring instrument detects the stroke frequency. This detected frequency is fed into a control circuit programmed with a characteristic corresponding to either immersion depth or ram adjustment as a function of stroke frequency. The output of the control circuit is a control signal coupled to a drive motor to maintain the constant immersion depth.

3 Claims, 4 Drawing Figures

CONTROL DRIVE FOR A RAM ADJUSTMENT DEVICE ON A BLANKING PRESS

FIELD OF THE INVENTION

The invention relates generally to a control drive. More particularly it relates to a control device for high speed blanking presses, wherein a motor, through a gear train with high step-down ratio, influences a control member to adjust a ram relative to a driving rod, and wherein the ram is clampable with respect to the driving rod after the adjustment has been performed.

BACKGROUND OF THE INVENTION

Control drives of this type are known per se U.S. Pat. No. 3,233,441. One example of the use of such a control drive is to adjust the stroke position for each top tool and bottom tool to be used. The adjustment is effected at a time other than the normal service, for example, during standstill of the blanking press at bottom dead-center. After the adjustment has been performed, the ram is clamped with respect to the driving rod. The blanking press can now be put into service.

It has been found that in such blanking presses the immersion depth of a top tool into an associated bottom tool increases with increasing working speed—i.e., higher stroke frequency. In the case of very high speed blanking presses running at for example more than 600 strokes/min., this phenomenon leads to increased tool wear. Due to the increasing use of complicated and expensive hard metal tools in the blanking presses previously described, this results in very high costs for the replacement of the fast wearing tools, more particularly for the production outlay incurred.

SUMMARY OF THE INVENTION

It is, therefore, an object of this invention to eliminate the cause of the increased wear, by substantially preventing any increase in the immersion depth of the top tool into the bottom tool as the stroke frequency increases.

This and other objects are achieved according to the invention in that during the service of the press the control drive is subject to the influence of a circuit arrangement which adjusts the ram so that the top tool fixed to the ram exhibits a virtually constant minimum immersion depth with reference to the bottom tool fixed on the press table over the entire stroke frequency range of the press.

The particular advantage of the control drive according to the invention is that the minimum necessary immersion depth is adjusted automatically during the operation of the blanking press, i.e., in all stroke frequency ranges dictated by service conditions. The useful life of the tools is thus significantly increased, thereby producing a considerable reduction in costs and increasing economy.

BRIEF DESCRIPTION OF THE DRAWING

Examples of the invention are explained more fully hereinbelow with reference to the accompanying drawing, wherein.

For reasons of clarity, identical components in the drawing have been provided with the same reference numerals.

DETAILED DESCRIPTION OF THE DRAWINGS

Figure 1:
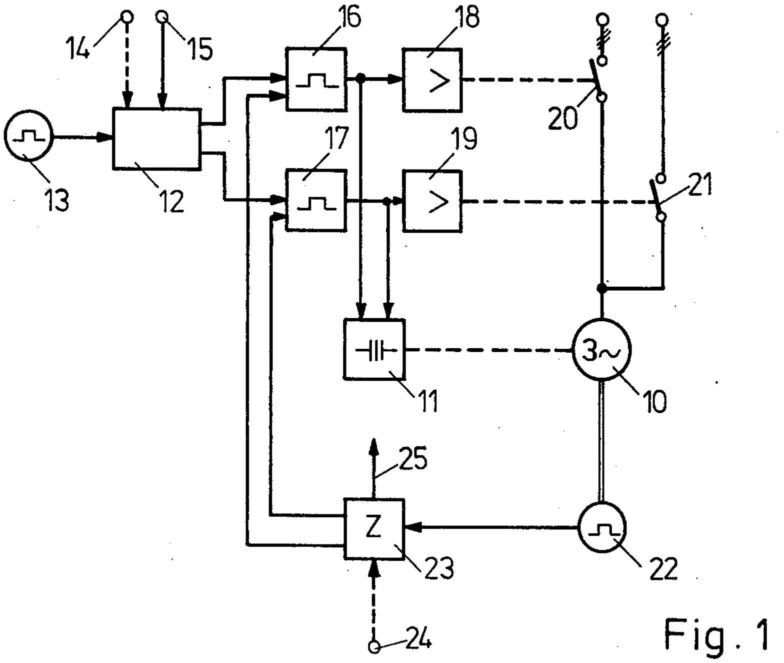
FIG. 1 shows a control drive with a control circuit which is programmable with a characteristic.
Figure 2:
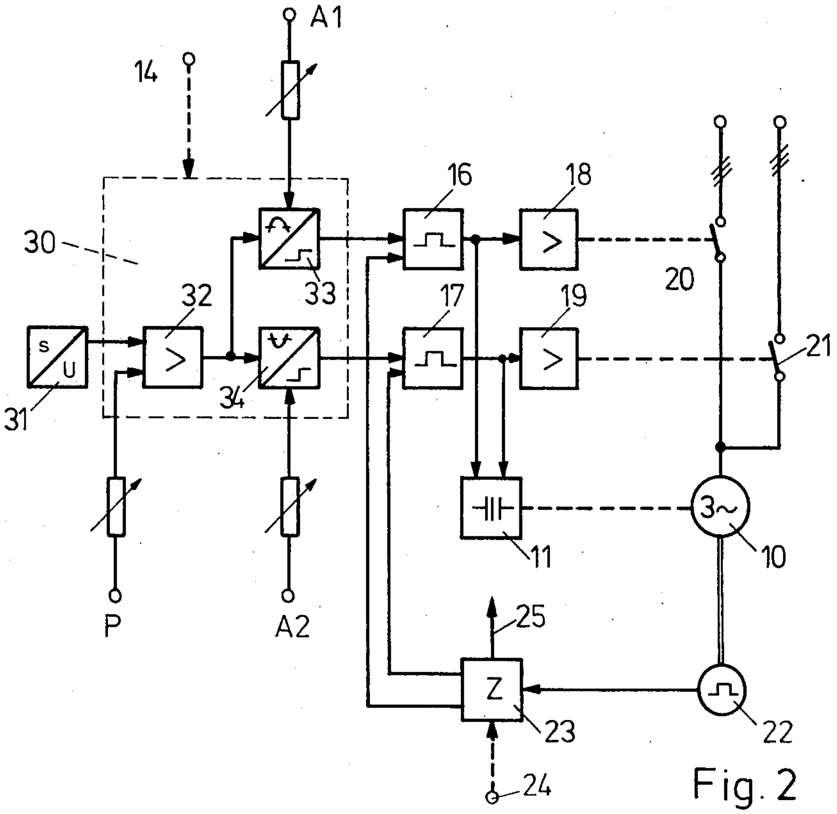
FIG. 2 shows an alternative embodiment control drive with a regulator.

Referring now to the drawings, and, in particular to FIGS. 1 and 2 a control drive is shown having a motor 10, which, through a gear train with a high step-down ratio influences in a known manner a control member to adjust a ram of a press with respect to a driving rod and clamp the ram after the adjustment has been performed. The clamping in this context may occur either mechanically or hydraulically. Such a clamping device 11 is shown as a functional block in the diagram.

In FIG. 1 a control circuit 12 is provided which is preceded by a measuring instrument 13 which delivers signals proportional to the stroke frequency of the blanking press. An example of such a control circuit 12 is a Schmitt Trigger Signal Conditioner such as the Siemens GEC 1 620 shown on pages 1/126 and 1/128 of their catalog ST 11 published in 1977. The control circuit 12 has a release input 14 which is set when the blanking press is switched on. Through a program input 15, a characteristic can be fed into the control circuit 12 which corresponds to the function of immersion depth e as a function of stroke frequency or ram adjustment as a function of the stroke frequency.

The control circuit 12 delivers output control signals which can be fed to a flip-flop stage with two parallel-connected monostable multivibrators. Examples of suitable monostable multivibrators are the Siemens GEC1-220, 221 and 230 models shown on pages 1/102 and 1/103 of the catalog ST 11 published in 1977. The monostable multivibrator 16 is modulated in the case of decreasing stroke frequency and the monostable multibivrator 17 in the case of increasing stroke frequency, whereby by means of the amplifiers 18, 19 following the monostable multivibrators 16, 17, the motor 10 is switched on with the corresponding direction of rotation through schematically illustrated switches 20, 21.

A pulse transmitter 22 is associated with the control drive (directly with the motor 10 in the present case). The output signals of this pulse transmitter 22 are proportional to the ram adjustment and are fed to a forward/reverse counter 23. The counter 23 is provided with a function input 24 which is set as soon as the blanking press is switched off. A release output 25 of the counter 23 feeds a signal as soon as the counter 23 is set to zero, for example when the ram adjustment is brought into the position corresponding to the initial position for a stationary blanking press. It is only in this initial situation that the blanking press can be put into service. In order to ensure this, the counter 23 is connected to the monostable multivibrators 16, 17 and thereby controls the motor 10 in the corresponding direction of rotation until the counter 23 has attained the value zero.

Figure 4:
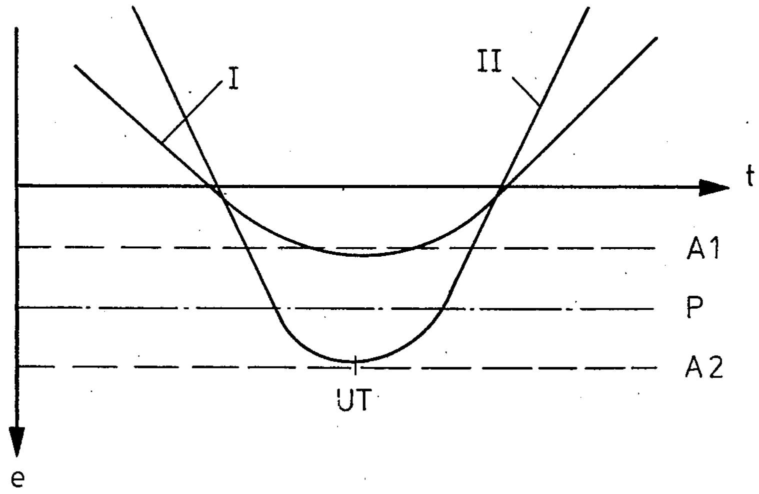
FIG. 4 shows a functional graph associated with FIG. 2.

The control drive according to FIG. 2 is in principle a regulated drive. For this purpose, a three-point regulator 30 is provided to which are fed an adjustable desired mean value P which corresponds to the mean immersion depth e of the top tool into a bottom tool, an adjustable admissible limit value A2, and an adjustable necessary limit value A1 of the immersion depth e (FIG. 4). The actual value of the immersion depth e is detected by an inductive immersion depth measuring instrument 31 and is also fed to the three-point regulator 30, which is composed of an amplifier 32 and threshold value switches 33, 34 for the limit values A1, A2. The outputs of the regulator 30 are connected to the monostable multivibrators 16, 17 in the same sense as in FIG. 1. The remainder of the circuit of FIG. 2 corresponds to the circuit according to FIG. 1 previously described.

Figure 3:
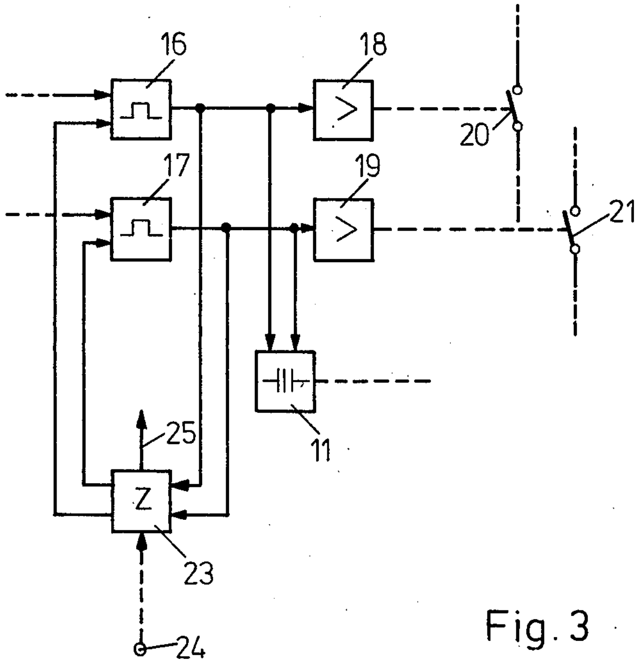
FIG. 3 shows an alternative circuit arrangement with a forward reverse counter.

The circuit shown in FIG. 3 corresponds to another type of arrangement with the forward/reverse counter 23 which in this case receives its signals corresponding to the ram adjustment directly from the monostable multivibrators 16, 17, so that the evaluation occurs directly in a control cabinet containing the entire electrical system.

The functional graph in FIG. 4 shows approximately the immersion depth e as a function of the crank position (corresponding to to the time t) for different stroke frequencies.

The operation of the control drives previously described is obtained in the following way according to FIG. 1. The function of either immersion depth e or ram adjustment as a function of stroke frequency is ascertained by measurement for each blanking tool to be used on the blanking press. This function is fed into the control circuit 12 through the program input 15. By putting the blanking press into service, the outputs of the control circuit 12 are released by setting the release input 14. Then, in conformity with the signals delivered by the measuring instrument 13, which are proportional to the stroke frequency of the blanking press, the control circuit 12 delivers control signals by which the flip-flop stage comprising the two parallel-connected monostable multivibrators 16, 17 is modulated. Depending upon the direction of the ram adjustment, the monostable multivibrator 16 or the monostable multivibrator 17 reacts, thereby switching on the amplifier 18 or the amplifier 19 for a predeterminable pulse duration. This, in turn, closes either the switch 20 or the switch 21 to operate the motor 10 to adjust the ram in the correct direction. This ram adjustment is fed through the pulse transmitter 22 into the forward/reverse counter 23.

When the blanking press is taken out of service, the counter 23 is modulated directly through the function input 24 so that the ram adjustment is automatically returned into an initial position by modulating one of the monostable multivibrators 16, 17 until the release output 25 signals a counter state zero. It is only subject to this condition that the blanking press can be started again. With this arrangement, it is therefore ensured that the blanking press can only be started with the initial position of the ram adjustment, regardless of the nature of the stoppage (e.g., "Emergency stop").

For operation of the circuit of FIG. 2, the control drive is equipped with a regulator 30 which may be chosen to be a three-point regulator which produces no regulation process within an admissible stable range (between A1 and A2, FIG. 4). From the non-contact inductive immerison depth measuring instrument 31, the actual value of the immersion depth e passes to the regulator 30. When, with increasing stroke frequency (FIG. 4 curve II), the immersion depth e exceeds the adjusted maximum admissible limit value A2, the regulator 30 modulates the monostable multivibrator 17. The amplifier 19 is correspondingly switched on, the switch 21 is closed, and the motor 10 is energized, whereby the ram is adjusted sufficiently to fall within the limit value A2. With decreasing stroke frequency (FIG. 4, curve I), when an equivalent function falls below the minimum possible limit value A1, the regulator 30, the monostable multivibrator 16, the amplifier 18, the switch 20 and the motor 10 act to adjust the ram sufficiently for the limit value A1 to be exceeded. The arrangement and function associated with the forward-/reverse counter 23 corresponds in this case to the function of the control drive according to FIG. 1.

In the case of both control drives according to FIGS. 1 and 2, the clamping mechanism 11 is inactivated as long as a ram adjustment is occurring. As soon as this adjustment is complete, i.e., in the normal case when the blanking press has attained its service stroke frequency, the ram adjustment is clamped by, for example, hydraulic activation of the clamping mechanism 11.

It is to be understood that the above-identified arrangements are simply illustrative of the application of the principles of this invention. Numerous other arrangements may be readily devised by those skilled in the art which embody the principles of the invention and fall within its spirit and scope.

We claim:

1. A control drive for a ram adjustment device on a high speed blanking press mounted on a press table and having a range of stroke frequencies, wherein a motor drives a control member to adjust a ram of the press relative to a driving rod of the press, and wherein the ram is clampable with respect to the driving rod after the adjustment is performed, the improvement comprising means to adjust the ram by driving the motor during the operation of the press so that a top tool fixed to the ram is held at a substantially constant immersion depth in an opening in a bottom tool fixed to the press table over the entire stroke frequency range of the press, wherein the means to adjust the ram further comprises:

a measuring instrument for detecting the stroke frequency of the blanking press; and a control circuit coupled to an output of the measuring instrument, said control circuit being programmable with a characteristic which corresponds to the function of immersion depth as a function of stroke frequency, said control circuit providing output control signals corresponding to the stroke frequency for the control drive, and wherein the means to adjust the ram further comprises a flip-flop circuit coupled to the output control signals of the control circuit and to the motor to control the operation of the motor in accordance with the output control signals of the control circuit, further comprising:

a pulse transmitter for providing signals which are directly proportional to the stroke of the ram adjustment device; and a counter coupled to an output of the pulse transmitter and to an input of the flip-flop circuit, said counter also having an input which indicates when the press is turned off to activate the counter to cause the flip-flop circuit to operate the motor to return the ram to its initial position after the press is turned off.

2. Control drive according to claim 1, wherein the pulse transmitter is coupled mechanically to the motor of the control drive.

3. Control drive according to claim 1, wherein the pulse transmitter is the flip-flop circuit.

* * * * *